United States Patent [19]

Sunnen

[11] Patent Number: 4,505,076
[45] Date of Patent: Mar. 19, 1985

[54] MEANS FOR DRIVINGLY ATTACHING A REPLACEABLE STONE ASSEMBLY TO A MASTER STONE HOLDER

[75] Inventor: Robert M. Sunnen, Frontenac, Mo.
[73] Assignee: Sunnen Products Company, St. Louis, Mo.
[21] Appl. No.: 545,120
[22] Filed: Oct. 26, 1983

Related U.S. Application Data

[63] Continuation of Ser. No. 314,856, Oct. 26, 1981, abandoned.

[51] Int. Cl.³ .............................................. B24B 33/00
[52] U.S. Cl. .................................... 51/206.5; 51/331; 403/248
[58] Field of Search ................... 51/204, 206.4, 206.5, 51/331, 338–354; 403/248, 249, 250, 251; 411/57, 60, 214, 215, 325, 15

[56] References Cited

U.S. PATENT DOCUMENTS

| | | | |
|---|---|---|---|
| Re. 19,149 | 4/1934 | Jeschke | 51/378 |
| 521,861 | 6/1894 | Zeiser et al. | 403/248 |
| 553,099 | 1/1896 | Brown | 403/248 X |
| 1,167,774 | 1/1916 | Mentzer | 411/325 |
| 1,904,336 | 4/1933 | Sunnen | 51/339 |
| 1,918,077 | 7/1933 | Agostoni | 51/339 |
| 2,020,589 | 11/1935 | Sunnen | 51/347 |
| 2,026,686 | 1/1936 | Kirley | 411/57 |
| 2,348,589 | 5/1944 | Auten | 411/15 |
| 2,750,717 | 6/1956 | Andrew | 51/350 |
| 3,403,483 | 10/1968 | Gjertsen et al. | 51/347 |
| 3,800,482 | 4/1974 | Sunnen | 51/351 X |
| 4,116,574 | 9/1978 | Pirovano et al. | 403/248 X |

FOREIGN PATENT DOCUMENTS

| | | | |
|---|---|---|---|
| 890080 | 4/1902 | France | 403/250 |
| 1553436 | 2/1968 | France | 411/60 |
| 2014683 | 8/1979 | United Kingdom | 411/57 |

*Primary Examiner*—Robert P. Olszewski
*Attorney, Agent, or Firm*—Haverstock, Garrett & Roberts

[57] ABSTRACT

A mounting assembly for an abrasive member comprising a support structure including a plate member having opposite surfaces and at least one opening extending therethrough between the opposite surfaces, a stone assembly for mounting on the plate member including a backing member having opposed surfaces one of which is to be placed adjacent to one of the opposite surfaces of the plate member, an abrasive member mounted on the other opposed surface of the backing member, tubular members corresponding in number to the number of openings in the plate member formed on the one opposed surface of the backing member at locations to register with and to be insertable into the corresponding openings in the plate member, and a member for threading or otherwise forcing into each respective tubular members when positioned extending into corresponding ones of the spaced plate openings to expand their tubular members outwardly in the corresponding plate openings to make a tight engagement with the plate member.

32 Claims, 22 Drawing Figures

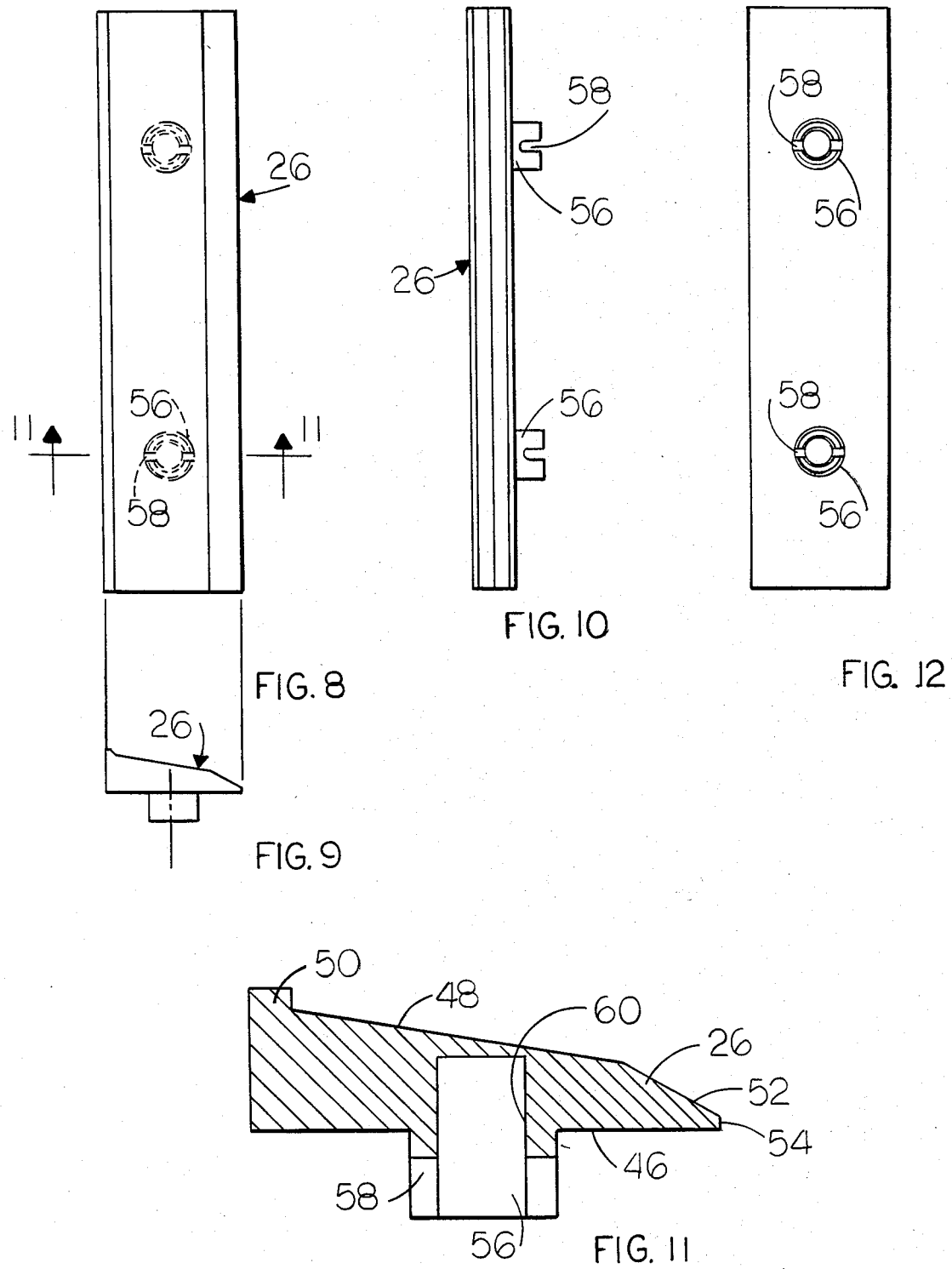

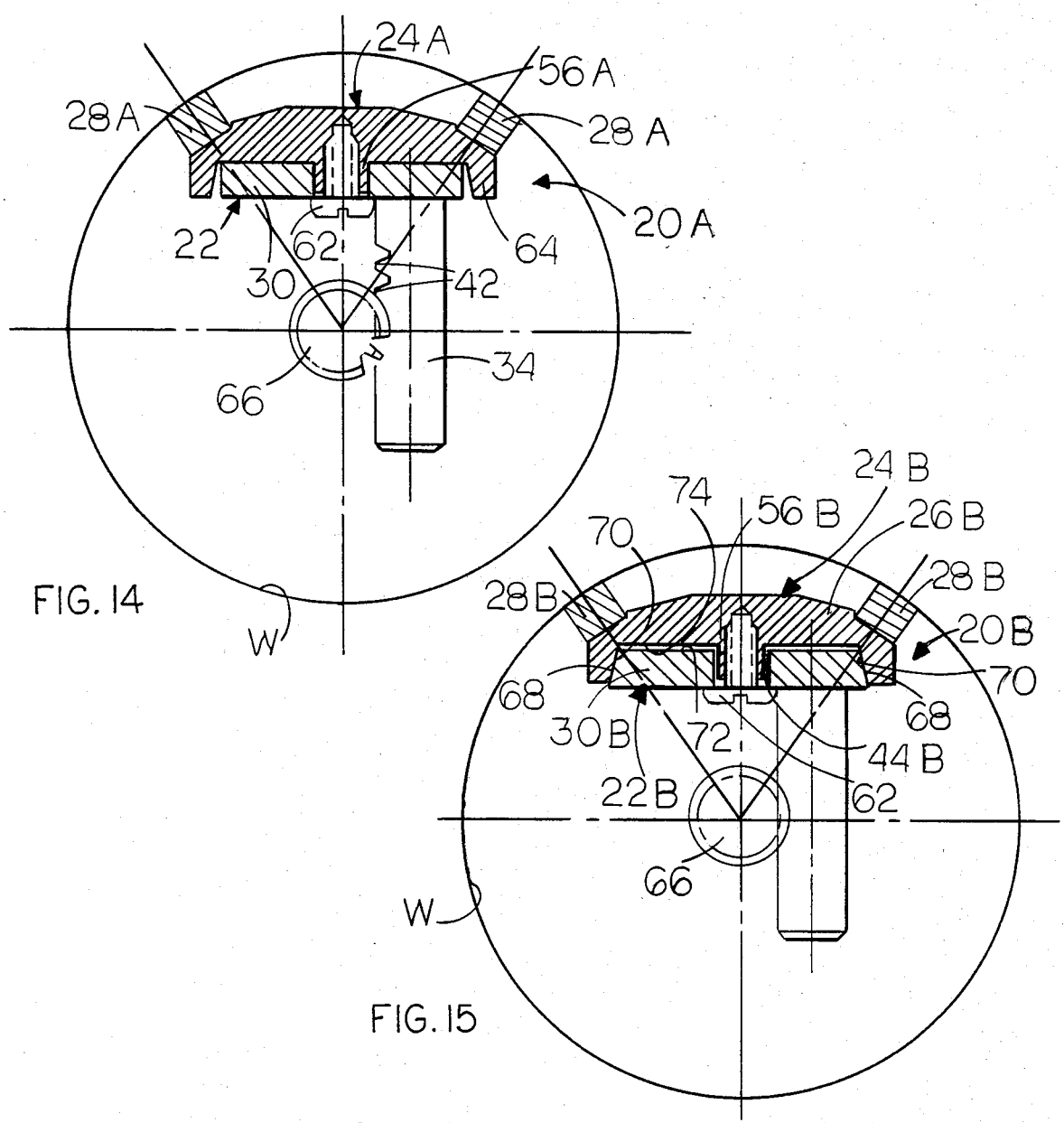
FIG. 14
FIG. 15
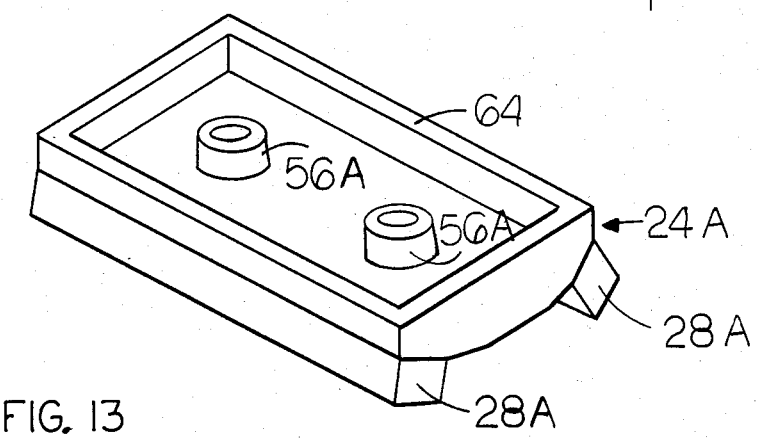
FIG. 13

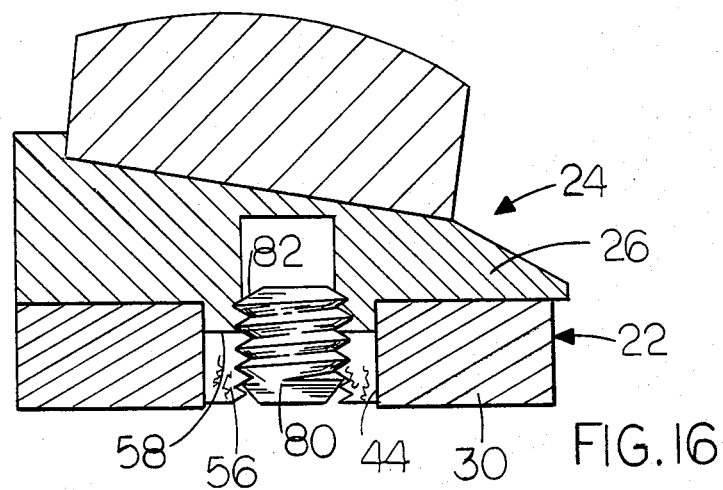
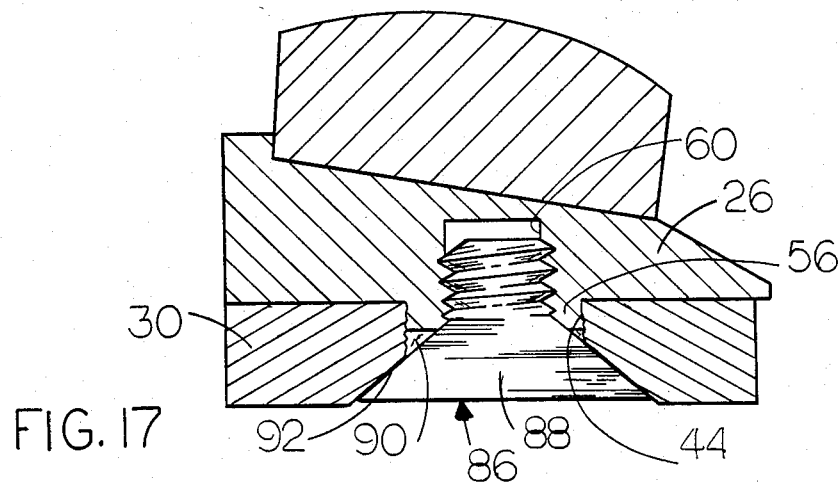
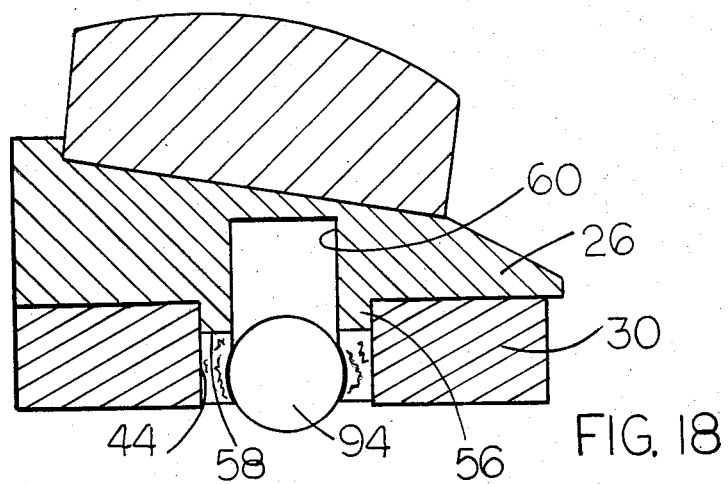

MEANS FOR DRIVINGLY ATTACHING A REPLACEABLE STONE ASSEMBLY TO A MASTER STONE HOLDER

The present application is a continuation of application Ser. No. 314,856, filed Oct. 26, 1981, and entitled MEANS FOR DRIVINGLY ATTACHING A REPLACEABLE STONE ASSEMBLY TO A MASTER STONE HOLDER, now abandoned.

BACKGROUND OF THE INVENTION

Honing mandrels and other similar devices having stone assemblies mounted on them have been used for many years and there are numerous designs and constructions of such devices some of which use single radially adjustable stone assemblies and others a plurality of circumferentially spaced stone assemblies, one or more of which are radially adjustable during a honing operation to maintain the stone assemblies in contact under pressure with work surface being honed. Many known stone assemblies and stone assembly movement means have been devised and used in the past including those disclosed in Sunnen U.S. Pat. Nos. RE 18,763; 1,902,194; 1,904,336; 1,946,041; 1,982,836; 2,040,281; 2,815,615 and 3,378,962.

DESCRIPTION OF THE PRIOR ART

Some of the known constructions have the stone members fixedly mounted on stone holder members which are then mounted on a mandrel or other similar device in various ways. With the known constructions, as the stones wear out, the stone assemblies, which usually include the mounting means therefor, are either discarded or the old stones are removed and new stones attached. Both of these procedures are wasteful and expensive to the user especially in those cases where the stone assemblies include expensive metal backing and support means. The present construction seeks to overcome such waste and expense by teaching the construction and attachment of a novel replaceable honing stone assembly which includes a reusable master stone holder and a replaceable stone assembly which is mountable on the master stone holder and where the replaceable assembly includes an inexpensive backing portion with one or more stones attached thereto. The replaceable stone assembly of the present construction is attached to the master stone holder in a novel manner using simple means that only require relatively available hand tools to attach and remove, and in a way so as to prevent looseness between the replaceable stone assembly and the master stone holder and at the same time provides a positive driving connection therebetween. When the stones of the present device wear and need replacing the replaceable stone assembly can be quickly and easily separated from the master stone holder and replaced by another similar stone assembly. This results in minimal waste to the customer and, because of the inexpensive cost of the replaceable stone assemblies, makes it uneconomic to remount stones on existing backing members which is time consuming, expensive and requires special equipment and materials. Also, since the backing material to which the stones are attached is inexpensive and is damaged by use, ther is little to be lost by discarding it rather than trying to reuse it by removing the worn stones and replacing them with new.

It is therefore a principal object of the present invention to provide a relatively inexpensive disposable stone assembly for mounting on master stone holders.

Another object is to reduce the cost of restoring a honing device to a like new honing condition.

Another object is to provide novel means for attaching a replaceable stone assembly to a master stone holder.

Another object is to make it uneconomic to remount stones on existing stone holder devices.

Another object is to teach a novel construction of a replaceable stone assembly and a master stone holder for mounting the stone assembly on.

Another object is to reduce the time and effort required to install a honing stone assembly on a stone holder in order to restore a honing device to a like-new operating condition.

Another object is to prevent mounting a stone assembly in a wrong position on a master stone holder.

Another object is to make it possible to attach a replaceable stone assembly to a master stone holder using simple and readily available hand tools.

Another object is to reduce the expense of maintaining a honing mandrel in an operative condition.

These and other objects and advantages of the present invention will become apparent after considering the following detailed specification which discloses preferred embodiments of the subject device in conjunction with the accompanying drawings which form a part thereof, and wherein:

BRIEF DESCRIPTION OF THE DRAWINGS

FIG. 8 is a top view of the portions of a replaceable stone assembly on which a stone is mounted;

FIG. 9 is an end view of the member shown in FIG. 8;

FIG. 10 is a right side view of the member shown in FIG. 8;

FIG. 11 is an enlarged cross-sectional view taken on line 11—11 of FIG. 8;

FIG. 12 is a bottom view of the member shown in FIGS. 8-11;

FIG. 13 is a perspective view of a modified stone assembly;

FIG. 14 is a cross-sectional view showing the modified stone assembly of FIG. 13 mounted on a master stone holder;

FIG. 15 is a cross-sectional view simiilar to FIG. 14 but showing another modified embodiment of the subject device.

FIGS. 16–18 are enlarged cross-sectional views showing other embodiments of means for attaching a replaceable stone assembly to the master stone holder;

DESCRIPTION OF PREFERRED EMBODIMENTS

Figure 1:
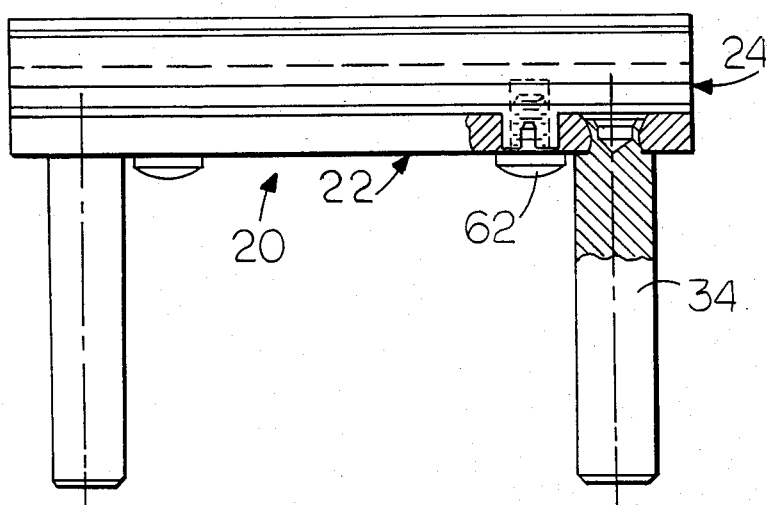
FIG. 1 is a side elevational view of a honing stone assembly and master stone holder therefor constructed according to the present invention.

Referring to the drawings more particularly by reference numbers, FIG. 1 shows a construction 20 which includes a master stone holder 22 and a replaceable stone assembly 24 for mounting thereon. The replaceable stone assembly 24 includes a stone mounting member 26, usually constructed of a relatively inexpensive material such as die cast zinc, die cast aluminum or some other like material with one or more honing stones such as honing stone 28 mounted thereon. The stone 28 can be attached to the mounting member in a variety of ways but the preferred way is to adhesively attach it while the parts to be joined are located and held in proper position as by using a jig or the like (not shown).

Figure 3:
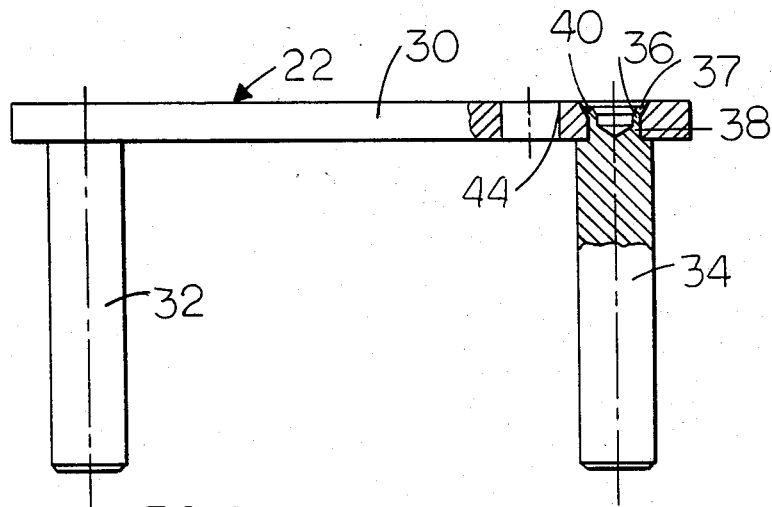
FIG. 3 is a side elevational view, partly in section, of the master stone holder portion only of the construction shown in FIGS. 1 and 2.
Figure 4:
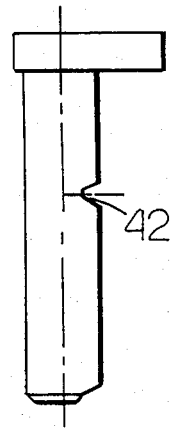
FIG. 4 is a right end view of the master stone holder of FIG. 3.
Figure 5:
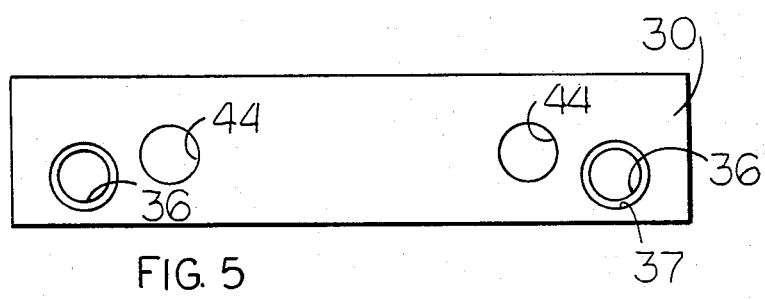
FIG. 5 is a top plan view of the upper portion only of the master stone holder shown in FIG. 3.
Figure 6:
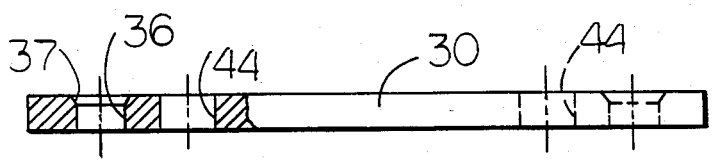
FIG. 6 is a side view, partly in section, of the member shown in FIG. 5.
Figure 7:
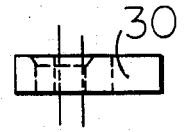
FIG. 7 is a right end view of the member shown in FIG. 6.

The master stone holder 22 includes an elongated rectangular plate 30 on which the stone assembly 24 is mounted, and it has attached to it adjacent its opposite ends spaced mounting members shown as rack gear members 32 and 34. To make these attachments the plate 30 as a pair of spaced holes 36 with tapered portions 37 (FIGS. 3, 5 and 6) adjacent its opposite ends, and each of the rack gear members 32 and 34 has a reduced diameter cylindrical end portion 38 which extends into respective holes 36, and when so positioned is staked as shown at 40 to make a secure connection with the tapered opening portion 37. The gear members 32 and 34 also have a plurality of gear teeth as illustrated by 42 formed along corresponding sides thereof to engage with a pinion gear to be described later located in a honing mandrel or other similar device and operated to radially move the stone assemblies during a honing operation in order to maintain the stones engaged with the work surface and to retract the stones when the mandrel is to be withdrawn from or inserted into a workpiece.

The plate 30 of the master stone holder 22 also has another pair of similar openings 44 shown located inwardly respectively from the openings 36 and more centrally laterally than the openings 36. The holes 44 are used for mounting the replaceable honing assembly 24 on the master stone holder 22 to make a firm strong connection therebetween as will be explained.

Figure 2:
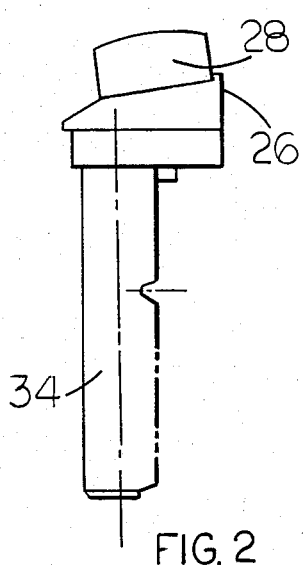
FIG. 2 is a right end view of the construction shown in FIG. 1.

The details of the backing portion 26 of the stone assembly 24 are shown in FIGS. 8–12. The backing member 26, as stated, is preferably constructed of an inexpensive material such as die-cast zinc, die-cast aluminum or other relative inexpensive material and has a lower surface 46 which abuts the upper surface of the plate 30 when installed and a sloping upper surface 48 which is the surface to which the stone 28 is attached in some manner as explained above. The surface 48 slopes relative to the lower surface 46 and extends the full length of the member 26. An upwardly projecting locating ridge 50 extends along one side of the surface 48 and the stone 28 extends therealong as shown in FIG. 2. The opposite edge of the sloping surface portion 48 from the ridge 50 extends to adjacent another sloping surface 52 that extends therefrom to the forward or leading edge 54 of the member 26.

The lower surface 46 of the die-cast member 26 has two similar integral tubular portions 56 attached thereto and extending therefrom as clearly shown in FIGS. 9, 10 and 11. The portions 56 extend from the surface 46 a distance slightly less than the thickness of the plate member 30 on the master stone holder 22, and the portions 56 are spaced apart and sized so that they will extend downwardly into the respective holes 44 in the plate 30 as shown in FIG. 1. Each of the tubular portions 56 also has a pair of opposed notches 58 formed extending therein from the free end as shown in FIGS. 10, 11 and 12. Also, as best shown in FIG. 11 the tubular portions 56 have cylindrical passages or chambers 60 formed therein, and the chambers 60 extend through the tubular portions 56 and partway into the body portion of the member 26. When the tubular members 56 are positioned extending into respective ones of the holes 44 in the plate 30, threaded members such as screws 62 are threaded into the tubular portions 56 as shown in FIG. 1. In so doing pressure is applied by the screw threads against the tubular members 56 to cut threads in them and to enlarge them so that they apply sideward force into engagement with the holes 44. This makes for a very secure attachment, and also makes for a relatively inexpensive construction and a construction that is easily and quickly installed and removed. This means that to replace one of the stone assemblies on the stone holder 22 it is only necessary after the assembly 20 is removed from the mandrel on which it is mounted to unscrew two of the screws 62 from the worn stone assembly 24 in order to remove it from the master holder 22, and to install another similar stone assembly using a procedure that is equally simple. During removal of a worn stone assembly 24 it may be necessary to tap on the ends of the tubular portions 56 to loosen them but this is usually not difficult to do.

It is important to the present invention that the master stone holder 22 be reusable since this portion of the subject device is preferably precision made of relatively hard steel and is a relatively expensive part. The only replaceable portion therefore is the stone assembly 24 which includes the relatively inexpensive backing 26 which is easily molded or die cast on a mass production basis and the stones 28 themselves which are the portions of the device that engage and operate on the work and undergo wear. The stone assemblies 24 including the backings 26 and the stones 28 can be massed produced relatively economically, and the backing 26 is preferably made of a relatively soft metal as indicated which can be upset by having threads formed in the tubular portions 56 as explained above. It is anticipated also that the tubular portions 56 can be slotted as shown by the dual slotted portions 58, although slotting may not be necessary in some cases. The portions 56 can also be slotted by a single slot in one side of the tubular portion 56 or they can have three or more spaced slots similar to the slots 58, if desired. It is expected that when the stone assembly 24 is locked into position on the stone holder 22 that some damage will be done to the tubular portions 56 by the threads of the members 62. This may limit the ability to be able to reattach the same stone assembly 24 repeatedly although it may be possible to reattach a stone assembly a time or two if necessary. This has not been found to be a disadvantage since it has been found that it is not generally economic to remount stones on a backing, and often when the stone on a stone assembly has been mostly used up the assembly is too worn out to be reconditioned for use anyway. Therefore, in the usual situation once a stone assembly 24 has been attached to a master stone holder 22 it will not be necessary or desirable to reattach the same stone assembly to the same or to a different master stone holder.

The backing portion 26 of the stone assembly 24 may optionally also include a flange such as the flange 64 (FIGS. 13 and 14) which extends downwardly along one or more sides thereof. The flanges 64 strengthen the assemblies 24 somewhat and help to prevent warping and bending, and the flanges may be positioned to extend downwardly in spaced relation to the adjacent sides of the master stone holders on which they are mounted as shown in FIG. 14. It haas been found that such flanges when they also extend across the ends of the assemblies 24 are more useful than those that extend only along the sides, but in most cases such flanges are not essential.

The size and/or spacing and/or locations of the holes 44 and of the tubular portions 56 may be selected to prevent wrong mounting and the mounting of wrong stone assemblies on a master stone holder. For example, it is contemplated to offset the location of both of the holes 44 and the respective tubular portions 56 toward one end of the device to prevent backwards mounting of a stone assembly. The location of the side flanges such as the flange 64 may also be such as to prevent an operator from accidentally or inadvertently mounting a stone assembly backwards on a master stone holder.

FIG. 13 shows a modified embodiment 24A of the honing stone assembly 24 constructed to accommodate two spaced parallel stones 28A mounted thereon. The assembly 24A has a peripheral flange like the peripheral flange 64 which extends therearound and around the master holder plate 30 when it is positioned thereon. It also has two spaced tubular portions which cooperate with the holes 44 in the master stone holder plate 30 as aforesaid. The tubular portions 56A may be slotted or unslotted as desired.

FIG. 14 is a cross sectional view of the modified assembly 20A including the modified stone assembly 24A mounted on the master stone holder assembly 22 with the flange 64 extending in spaced relation around the sides of the master stone holder. In this construction the plate 30 is positioned in surface-to-surface contact with one surface of the stone assembly 24A as above, and the connection between the stone assembly 24A and the master stone holder 22 is made in a manner similar to that described above using tapered threaded members 62 to cooperate with each of the tubular portions 56A. The master stone holder 22 also includes rack gear members such the rack gear members 32 and 34 which cooperate with a pinion gear 66 located in a mandrel such as a honing mandrel. The pinion gear 66 is rotated to radially move the assembly 20A in the manner already described.

In FIG. 15 another modified embodiment 20B is shown which is similar to the embodiment 20A but differs therefrom in the manner in which the stone assembly 24B and the plate 30B are constructed and are attached to each other. In the modified construction 20B the master stone holder plate 30B has tapered or beveled opposite edges 68 which engage similarly tapered or beveled surfaces 70 formed on the inner surface of the flange 64 on the backing member 26B. When so engaged a space is formed between surface 72 on the master stone holder member 30B and the surface 74 on the backing member 26B. Also in the construction 20B the tubular portions 56B on the backing member 26B are somewhat smaller in diameter than the diameter of the holes 44B in the master stone holder plate 30B so that when the threaded members 62 are tightened using a screwdriver or like tool there will be some force exerted pulling down on and flexing the backing member 26B and camming the beveled surfaces 68 and 70 against each other. For some applications this kind of connection may be advantageous. In both the constructions 20A and 20B provision is made for having two parallel spaced stone members such as the stone members 28A and 28B mounted thereon. Also in FIGS. 14 and 15 a circular outline W is also shown to represent the cylindrical surface of a work piece to be honed by the subject device. As the surface is enlarged, or as the stones wear down, it will be necessary to rotate the pinion gear 66 to move the honing stones outwardly to maintain them engaged with the work surface. In like manner after a honing operation is completed or before a honing mandrel is inserted into a work surface, the pinion gear 66 may be rotated in the opposite direction to retract the stone assemblies so that the honing mandrel can be moved into or out of the work.

FIGS. 16–18 show other means for making the attachment between a stone assembly such as the stone assembly 24 and the master stone holder 22, and particularly between the stone assembly mounting member 26 and the master stone holder 22. In FIG. 16 the attachment means is shown including a headless set screw 80. The set screw 80 may have a socket for a wrench such as for a hexagonal key wrench, and the leading end portion of the set screw 80 is preferably tapered as at 82 to facilitate starting it into the tubular portion 56. The threads of the set screw 80 may also be somewhat tapered from end-to-end having their largest diameter at the trailing end although this is not essential. When the set screw 80 is threaded into one of the tubular portions 56 it cuts its own threads and in so doing expands the portion 56 outwardly, as aforesaid, to make a tight connection thereof with the bore 44 in the master stone holder 22. An advantage of the construction shown in FIG. 16 is that the set screw 80 need not have a head portion which can in some cases restrict inward movement of the honing assembly on a honing mandrel. This is especially advantageous on small diameter mandrels and may enable a greater range of radial adjustment of the stone assembly without having to modify the mandrel body to accommodate the heads of screws.

FIG. 17 shows the use of another form of threaded member 86 for making the attachment, which form likewise does not protrude from the master stone holder plate 30. In this case the threaded member 86 has a tapered head portion 88, and the bore 44 in the plate 30, and possibly also the bore 60 in the tubular portion 56, are modified somewhat by being tapered to accommodate the screw head 88. In this construction the bore 60 in the tubular portion 56 is shown tapered at 90 in such a way that the head portion 88 will engage it slightly before it engages tapered portion 92 of the bore 44. This will produce some outward movement or expansion of the portion 56 into engagement with the bore 44 and improve the connection therebetween.

FIG. 18 shows a construction wherein a ball member such as ball bearing 94 is forced by being driven or pressed into the bore 60 in the tubular portion. The member 94 is large enough to expand the portion 56 outwardly into engagement with the bore 44. The depth of penetration of the ball member 94 should be such as to maintain outward pressure on the tubular portion 56 preferably in the region of the grooves 58.

Figure 19:
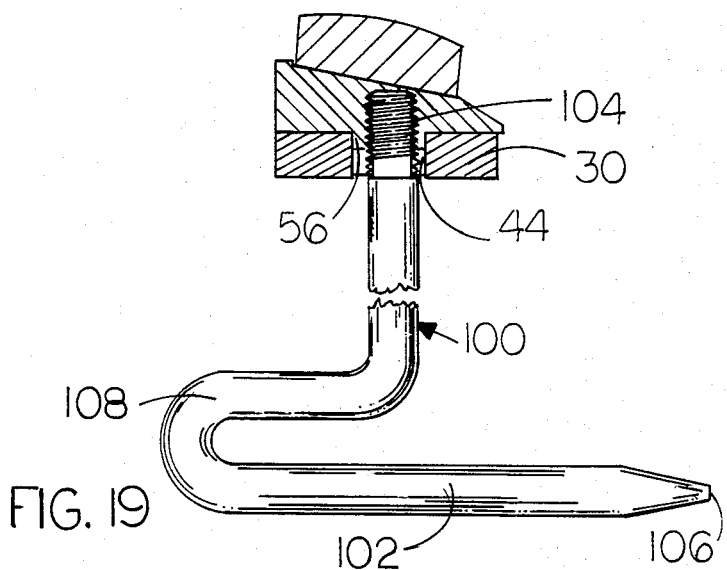
FIG. 19 is a cross-sectional view showing a replaceable stone assembly being attached to a master stone holder by means of a special tool.

FIG. 19 shows the use of a tool 100 which includes a handle portion 102 and a threaded end portion 104. The threads 104 should be such that when they are threaded into the tubular portion 56 they will expand the portion 56 outwardly into engagement with the bore 44. The threads 104 may be tapered to facilitate starting the tool 100 into the portion 56, and tapering of the threads may also provide increasing expansion as the tool is threaded into the bore so as to provide a tight connection between the tubular portion 56 and the bore 44. After the tool 100 has been used to expand the tubular portion 56 into engagement with the bore 44 it is removed by being threaded out leaving the expanded portion 56 engaged with the bore 44. The handle portion 102 of the tool 100 has a relatively blunt tapered end portion 106 which is sized to extend to the base of the bore 60 when the portion 56 is connected to the plate member 30 so that the handle can be tapped or pounded on to drive the tubular portion 56 out of the bore 44. This facilitates removal of a worn stone assembly when a new stone assembly is to be installed.

Figure 20:
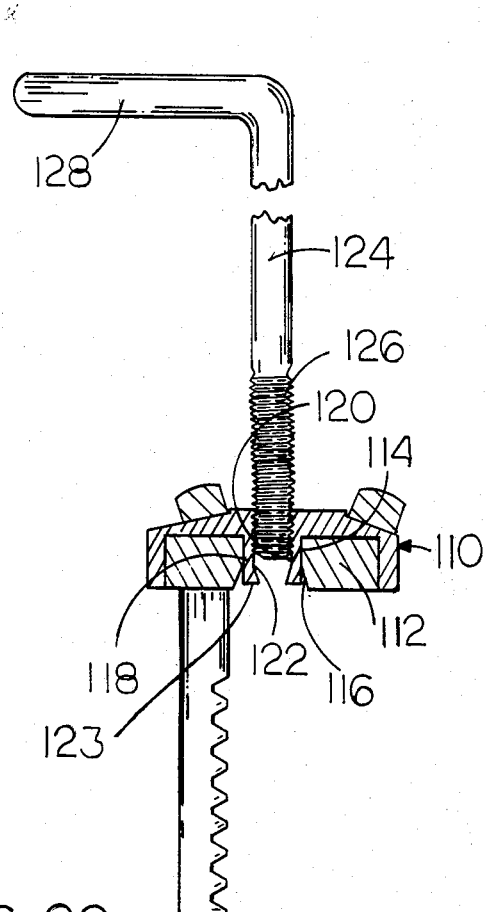
FIG. 20 is a cross-sectional view showing yet another embodiment of means for attaching a replaceable stone assembly to a master stone holder by means which do not require that the stone assembly be removed from a mandrel on which it is installed, said means being shown before the attachment is made.
Figure 21:
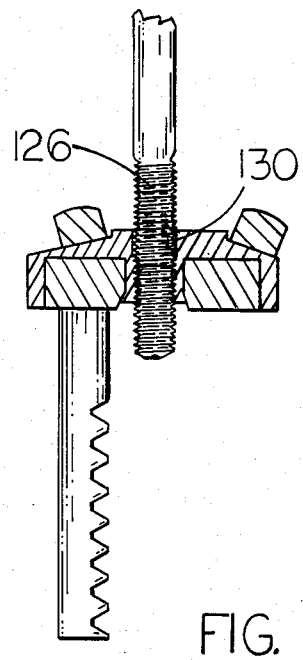
FIG. 21 shows the assembly of FIG. 20 after the tool has completed the connection between the replaceable stone assembly and the master stone holder.

FIGS. 20 and 21 show yet another way for attaching a stone assembly, albeit a double stone assembly 110 similar to the assembly 24A shown in FIGS. 13 and 14, to a master stone holder plate 112. The master stone holder assembly plate 112 has one or more bores such as bore 114 therethrough, and the bore 114 is shown as cylindrical over a portion of its length and is tapered over at least a portion thereof as at 116.

The stone assembly 110 has a tubular portion 118 which has a cylindrical outer surface to register with and to fit into the bore 114, and the portion 118 has an inner surface 120 which is cylindrical over much of its length but is necked down or tapered at 122 so that its smallest diameter is adjacent the free end of the member 118. This means that the wall of the tubular portion 118 will be thicker at 123 than over the rest of its length. In order to attach the stone assembly 110 to the master stone holder plate 112, the members are assembled with the portions 118 extending into the respective bores 114, and thereafter a tool 124 which has a threaded end portion 126 and a handle portion such as a right angle handle portion 128, is positioned as shown in FIG. 20. In this position the tool 124 is turned to thread it into the bore 120 and to cut and form threads therein as it goes thereby to expand the portion 118 outwardly. In so doing the tool will also thread its way through the necked down thickened end portion 123 causing the portion 123 to expand outwardly further than the rest of the portion 118. This moves the portion 123 outwardly into engagement with the tapered inner surface 116 of the bore 114 producing positive engagement therewith. This engagement will prevent the parts from loosening or coming apart. It is also contemplated to provide a step in the bore 114 adjacent the free end thereof for the same purpose but a tapered engagement is usually preferred because it is easier to separate the parts for replacement of a worn stone assembly.

In FIG. 21 the bore 120 shown enlarged at 130 so that the threads 126 of the tool will start to cut threads in the portion 118 midway through the backing member. The enlarged bore portion 130 therefore acts to guide for the tool 124 which may be an advantage in some cases and may also prevent stressing the body portion of the stone backing member. In FIG. 21 the threaded tool portion 126 is shown after it has threaded its way completely through the bore 120. It will be apparent that as the tool moves through the necked down portion 123 it will encounter the most resistance to turning because the diameter of the bore is smallest and the thickness of the metal is largest. However, as the tool emerges from the necked down portion 123 the pressure required to continue to turn the tool will suddenly decrease and little or no further expansion of the portion 123 will take place. This means that the amount of possible expansion of the portion 123 can be accurately controlled and limited, as desired, and without enabling the operator to apply excessive force which might otherwise break or crack the tubular portion 118.

The main advantage of constructions such as those shown in FIGS. 19 and 21 is that the attachment of the stone assembly to the master stone holder can be accomplished without requiring that a screw or other threaded member be left in the assembly. Another advantage of the constructions shown in FIGS. 20 and 21 is that the attachment can be made without requiring that the entire assembly be removed from the mandrel on which it is mounted. The latter advantage can represent a substantial saving in the time required to replace the stones on a mandrel. The same features can also be applied to an assembly having a single stone or a row of stones on it. However, for a single stone assembly it may be necessary to have the tubular portions offset somewhat so that they are not located directly under the stone member.

Figure 22:
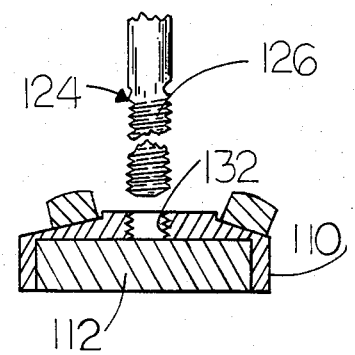
FIG. 22 is a cross-sectional view through the assembly of FIGS. 21 and 22 but taken at a location therealong that is spaced from the locations shown therein.

In order to remove the replaceable stone assemblies shown in FIGS. 20 and 21 from the master stone holder one or more separate bores sich as the bore 132 in FIG. 22 can be made in the assembly 110 at spaced locations from one or both of the tubular portions 118. The bores 132 are preferably non-threaded so that the removal tool 124 will cut its own threads although they can be threaded, if desired. The bores 132 threadedly receive the threaded end portion 126 of the tool 124, and when the tool 124 is turned into the bores 132 the end of the tool will move against the master stone holder 112 so that additional turning will apply force against the master holder 112 in a direction to force the members apart. One such bore 132 can be located adjacent each of the tubular portions 118 although in some cases a single centrally located bore may be all that is necessary. The same means can be used to separate any of the stone assemblies described herein from their master holder, but this is not usually necessary with the constructions wherein the assembly is first removed from the mandrel before a new stone assembly is attached. This is because when the assembly is removed from the mandrel access to the tubular portions 56 is easy to obtain.

Thus there has been shown and described several different embodiments of novel stone mounting means including a novel stone assembly and novel means for mounting the stone assembly on a master stone holder which fulfill all of the objects and advantages sought therefor. It will be apparent to those skilled in the art, however, that many changes, modifications, variations and other uses and applications of the subject device are possible and contemplated, and all such changes, modifications, variations and other uses and applications which do not depart from the spirit and scope of the invention are deemed to be covered by the invention which is limited only by the claims which follow.

What is claimed is:

1. Mounting means for honing stones and the like comprising a support structure including a plate member having opposite surfaces and spaced openings located extending therethrough, a stone assembly for mounting on the plate member including a backing member formed of a material that is relatively malleable, said backing member having opposed surfaces one of which is adapted to be placed in surface-to-surface contact with one of the opposed surfaces of the plate member, a honing stone mounted on the other opposed surface of the backing member, at least two spaced tubular members formed integrally on said one opposed surface of the backing member at locations to simultaneously register with and to be insertable into the respective spaced openings in the plate member, said tubular members each having an opening extending therethrough which openings also extend through the backing member thereat, the surface contour of the outer surfaces of the spaced tubular members closely conforming to the surface contour of at least a portion of the respective spaced openings in the plate member so that the tubular members can be simultaneously inserted into the respective spaced openings in the plate member while in substantially surface-to-surface contact therewith, and a threaded member having a threaded portion for threading through the openings in each respective tubular member starting from either end thereof when the tubular members are positioned extending into respective ones of the spaced plate openings whereby the threaded portion of the threaded member permanently plastically deforms said tubular members as it forms threads therein and simultaneously expands the tubular members outwardly in the respective openings to make a permanent tight engagement with the plate member to connect the backing member to the plate member, said permanent tight engagement with the plate openings remaining even if the threaded member is removed.

2. The mounting means of claim 1 wherein the backing member is constructed of a softer metal than the plate member.

3. The mounting means of claim 1 wherein the tubular members extend from ends attached to the backing member to opposite free ends, and axial extending notches formed in the tubular members and extending therein from the free ends thereof to facilicate radial expansion when the threaded fastener members are tightened therein.

4. The mounting means of claim 1 wherein the tubular members extend outwardly from the backing member to which they are attached a distance that is less than the distance between the opposed surfaces of the plate member.

5. The mounting means of claim 1 wherein the backing member is formed of die-cast zinc.

6. The mounting means of claim 1 wherein the backing member includes an integral flange which extends therefrom to adjacent at least one side of the plate member to which it is attached.

7. The mounting means of claim 1 wherein the backing member includes a peripheral flange which extends outwardly therefrom around the side edges of the plate member when the stone assembly is mounted thereon.

8. The mounting means of claim 1 wherein the surface on which the stone is mounted is acutely angularly related to the one opposed surface thereof that is adjacent to the plate member.

9. The mounting means of claim 8 including a ridge on the backing member extending along one side edge of the surface of the backing member along one side of the honing stone attached thereto.

10. The mounting means of claim 1 wherein the threads on the threaded portion of the threaded member are tapered becoming larger in diameter adjacent to one end than the other.

11. A work engaging assembly for mounting on a mandrel or like device comprising a support structure including a plate member having opposed surfaces and a pair of spaced outwardly extending rack gear members mounted extending from one of the opposed surfaces thereof, a pair of spaced openings extending through the plate member between the opposed surfaces, and an abrasive assembly mounted on the plate member, said abrasive assembly including a backing member formed of a relatively malleable material that is capable of permanent plastic deformation and has opposite surfaces one of which is mounted adjacent to the other of the opposed surfaces of the plate member, an abrasive member mounted on the other opposed surface of the backing member, said backing member having a pair of spaced integral tubular portions attached thereto at spaced locations thereon that register with and extend into the spaced openings in the plate member, each of said tubular portions having an opening that extends therethrough which openings also extend through the backing member, the surface contour of the outer surfaces of the spaced tubular portions closely conforming to the surface contour of at least a portion of the respective spaced openings in the plate member so that the tubular portions can be simultaneously inserted into the respective spaced openings in the plate member while in substantially surface-to-surface contact therewith, and a threaded member for threadedly engaging and entering the respective openings through the tubular portions and the backing member commencing from either end thereof to form threads therein and to simultaneously expand the tubular portions radially outwardly and permanently plastically deform them into permanent tight fitting engagement with the plate member to connect the backing member to the plate member which deformation maintains tight fitting engagement between the backing member and the plate member even if the threaded member is removed.

12. The work engaging assembly of claim 11 wherein the tubular portions of the backing member extend outwardly therefrom a distance less than the distance between the opposed surfaces of the plate member, each of said tubular portions having a first end attached to the backing member and an opposite free end, and at least one groove formed extending into each of the tubular portions from the free end thereof to facilitate radial expansion thereof when the threaded member is threaded therein.

13. The work engaging assembly of claim 11 including a peripheral flange extending from the backing member for extending around the plate member when the backing member is attached thereto.

14. The work engaging assembly of claim 11 wherein the opposite surfaces of the backing member are acutely angularly related.

15. The work engaging assembly of claim 11 wherein the backing member is formed of die-cast zinc.

16. The work engaging assembly of claim 11 including a stone member adhesively attached to the backing member on the opposite side thereof from the plate member.

17. Mounting means for honing stones and the like comprising a support structure including a plate member having opposite surfaces and a pair of spaced openings located therethrough, a stone assembly for mounting on the plate member including a backing member formed of a material that is relatively malleable and has opposed surfaces one of which is adapted to be placed adjacent to one of the surfaces of the plate member, at least one stone member mounted on the other opposed surface of the backing member, a pair of spaced tubular projections formed on said one opposed surface of the backing member at locations to register with and to be insertable into the respective spaced openings in the plate member, each of said tubular projections and the adjacent portions of the backing member having openings extending therethrough, the surface contour of the outer surfaces of the spaced tubular projections closely conforming to the surface contour of at least a portion of the respective spaced openings in the plate member so that the tubular projections can be simultaneously inserted into the respective spaced openings in the plate member while in substantially surface-to-surface contact therewith, said plate member having a side edge extending around the periphery thereof between the opposite surfaces and said backing member having a peripheral flange that extends around the peripheral side edge of the plate member, and a threaded member having a threaded portion for threading into the opening in each respective tubular projection and adjacent portions of the backing member commencing from either end thereof whereby the threaded portion of the threaded member cuts threads into the tubular projections and simultaneously expands the tubular projections outwardly in the respective plate openings whereby said tubular projections undergo permanent plastic deformation and intimately engage the respective openings in the plate member to form a tight fitting connection between the stone assembly and the support structure to connect the backing member to the plate member which plastic deformation maintains a tight fitting connection between the tubular projections and the respective openings in the plate member even if the threaded member is removed.

18. The mounting means of claim 17 wherein two stone members are mounted in parallel spaced relationship on the other opposed surface of the backing member.

19. The mounting means of claim 17 wherein a pair of spaced parallel gear members are attached to the plate member and extend outwardly therefrom.

20. Mounting means for honing stones and the like comprising a support structure including a plate member having opposite surfaces and at least two spaced openings located extending therethrough, a stone assembly for mounting on the plate member including a backing member formed of a relatively malleable material capable of permanent plastic deformation and having opposed surfaces one of which is adapted to be placed in contact with one of the opposite surfaces of the plate member, at least one honing stone mounted on the other opposed surface of the backing member, at least two spaced tubular members formed integrally on said one opposed surface of the backing member at locations to register with and to be insertable into the respective spaced openings in the plate member, each opening in the plate member having a portion of increased diameter opposite the one surface thereof, the surface contour of the outer surfaces of the spaced tubular members closely conforming to the surface contour of at least a portion of the respective spaced openings in the plate member so that the tubular members can be simultaneously inserted into the respective spaced openings in the plate member while in substantially surface-to-surface contact therewith, the spaced tubular members having openings that extend therethough and through the backing member, each of said openings through the tubular members having a smaller diameter portion thereof adjacent the free ends thereof, and a member having a threaded portion for threading into said tubular members through the backing member for cutting threads in the tubular members and simultaneously expanding the tubular members outwardly into engagement with the respective openings in the plate member whereby the tubular members undergo permanent plastic deformation and become intimately engaged with the respective openings in the plate member, said plastic deformation being sufficient to maintain intimate engagement between the tubular members and the openings in the plate member even if the threaded member is removed.

21. The mounting means of claim 20 wherein the threaded portion of the threaded member can enter the openings through the tubular members and through the backing member from either opposite end thereof.

22. The mounting means of claims 20 wherein a pair of spaced honing stones are mounted on the backing member in spaced relationship on the opposite side thereof from the tubular members.

23. Mounting means for honing stones and the like comprising a support structure including a plate member having opposite surfaces and at least two spaced openings extending therethrough, a stone assembly for mounting on the plate member including a backing member formed of a relatively malleable material capable when stressed of undergoing permanent plastic deformation and having opposed surfaces one of which is adapted to be placed in contact with one of the opposite surfaces of the plate member, a honing stone mounted on the other opposed surface of the backing member, at least two spaced tubular members corresponding in number and spacing to the number and spacing of the openings in the plate member formed integrally on said one opposed surface of the backing member and located thereon to register with and to be insertable into the corresponding number of openings in the plate member, the tubular members and the backing member defining passages that extend through the tubular members and backing member, the surface contour of the outer surfaces of the spaced tubular members closely conforming to the surface contour of at least a portion of the respective ones of the spaced openings in the plate member so that the tubular members can be simultaneously inserted into the respective spaced openings in the plate member while in substantially surface-to-surface contact therewith, and means insertable into the passage in each of said tubular members from either selected end thereof to radially expand and permanently plastically deform said tubular members outwardly into engagement with the corresponding openings in the plate member, said permanent plastic deformation being sufficient to maintain a tight fitting engagement between the tubular members and the openings in the plate member even if the means insertable are removed from the respective tubular members.

24. The mounting means of claim 23 wherein the means insertable into the tubular members includes a headless threaded member.

25. The mounting means of claim 23 wherein the means insertable into the tubular members includes a ball member having a diameter slightly larger than the inner diameter of the tubular members.

26. The mounting means of claims 23 wherein the openings through the plate member have beveled portions which extend inwardly therefrom opposite the backing member, and the means insertable into the tubular members includes a threaded member having a tapered head portion adapted to mate with the tapered surface of the respective openings in the plate member.

27. Mounting means for honing stones and the like comprising a support structure including a plate member having opposite surfaces and a pair of spaced openings located extending therethrough, a stone assembly for mounting on the plate member including a backing member having opposed surfaces one of which is adapted to be placed adjacent to one of the surfaces of the plate member, at least one stone member mounted on the other opposed surface of the backing member, spaced tubular projections formed on said one opposed surface of the backing member at locations to register with and to be insertable into the respective spaced openings in plate member, said plate member having a side edge extending around the periphery thereof between the opposite surfaces and said backing member having a peripheral flange that extends around the peripheral side edge of the plate member, corresponding portions of the peripheral side edge portion of the plate and of the peripheral flange on the backing member being beveled for engagement when the stone assembly is positioned on the plate, said engagement establishing a space between the plate member and the backing member, and a threaded fastener member having a threaded portion for threading into each respective tubular projection that is positioned extending into one of the spaced plate openings whereby the threaded portions of the fastener members cut threads into the tubular projections and simultaneously expand the tubular projections outwardly in the respective plate openings.

28. The mounting means of claim 27 wherein the spaced tubular members are smaller in size than the corresponding openings through the plate member.

29. Mounting means for honing stones and the like comprising a support structure including a plate member having opposite surfaces and spaced openings located extending therethrough, a stone assembly for mounting on the plate member including a backing member having opposed surfaces one of which is adapted to be placed in contact with one of the opposite surfaces of the plate member, at least one honing stone mounted on the other opposed surface of the backing member, spaced tubular members formed on said one opposed surface of the backing member at locations to register with and to be insertable into the respective spaced openings in the plate member, the openings in the plate member having a portion of increased diameter opposite the one surface thereof, and the spaced tubular members having openings that extend therethrough and through the backing member, said openings through the tubular members having a smaller diameter portion thereof adjacent the free end thereof, a member having a threaded portion for threading into said tubular members through the backing member for cutting threads in the tubular members and simultaneously expanding the tubular members outwardly into engagement with the respective openings in the plate member, and an opening formed through the backing member at a location spaced from the tubular portions for receiving a threaded member used for separating the backing member from the plate member.

30. The mounting means of claim 29 wherein the opening formed through the backing member is threaded.

31. Mounting means for honing stones and the like comprising a support structure including a plate member having opposite surfaces and a pair of spaced openings located extending therethrough, a stone assembly for mounting on the plate member including a backing member formed of a material that is relatively malleable and has opposed surfaces one of which is adapted to be placed adjacent to one of the surfaces of the plate member, at least one stone member mounted on the other opposed surface of the backing member, spaced tubular projections formed on said one opposed surface of the backing member at locations to register with and to be insertable into the respective spaced openings in the plate member, said plate member having a side edge extending around the periphery thereof between the opposite surfaces and said backing member having a peripheral flange that extends around the peripheral side edge of the plate member, corresponding portions of the peripheral side edge portion of the plate and the peripheral flange of the backing member being beveled for engagement when the stone assembly is positioned on the plate, said engagement establishing a space between the plate member and the backing member and a threaded fastener member having a threaded portion for threading into each respective tubular projection that is positioned extending into one of the spaced plate openings whereby the threaded portions of the fastener members cut threads into the tubular projections and simultaneously expand the tubular projections outwardly in the respective plate openings whereby said tubular projections undergo permanent plastic deformation and intimately engage the respective openings in the plate member to form a tight fitting connection between the stone assembly and the support structure.

32. The mounting means of claim 31 wherein the spaced tubular members are smaller in size than the corresponding openings through the plate member.

* * * * *

UNITED STATES PATENT OFFICE
CERTIFICATE OF CORRECTION

Patent No. 4,505,076     Dated March 19, 1985

Inventor(s) Robert M. Sunnen

It is certified that error appears in the above-identified patent and that said Letters Patent are hereby corrected as shown below:

Column 1, line 66, "ther" should be --there--.

Column 2, line 50, "portions" should be --portion--.

Column 2, line 66, "simiilar" should be --similar--.

Column 5, line 25, "haas" should be --has--.

Column 8, line 44, "sich" should be --such--.

Signed and Sealed this

Twenty-third Day of July 1985

[SEAL]

Attest:

DONALD J. QUIGG

Attesting Officer     Acting Commissioner of Patents and Trademarks